United States Patent
Hardjono (10) Patent No.: US 6,587,943 B1
(45) Date of Patent: Jul. 1, 2003

(54) APPARATUS AND METHOD FOR LIMITING UNAUTHORIZED ACCESS TO A NETWORK MULTICAST

(75) Inventor: Thomas Hardjono, Arlington, MA (US)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/204,930

(22) Filed: Dec. 3, 1998

(51) Int. Cl.[7] .............................. H04L 9/00; H04K 1/02; G06F 15/177; G06F 15/16
(52) U.S. Cl. ..................... 713/163; 713/151; 713/153; 380/252; 709/206; 709/221
(58) Field of Search .................... 709/204–206, 709/208, 221, 230, 236, 238; 380/211, 252; 713/153–154, 162–163, 170

(56) References Cited

U.S. PATENT DOCUMENTS

| | | | | |
|---|---|---|---|---|
| 4,809,327 A | * | 2/1989 | Shima ........................ | 713/163 |
| 5,522,046 A | * | 5/1996 | McMillen et al. .......... | 709/239 |
| 5,608,726 A | | 3/1997 | Virgile ....................... | 370/401 |
| 5,663,896 A | * | 9/1997 | Aucsmith ................... | 713/201 |
| 5,748,736 A | * | 5/1998 | Mittra ........................ | 380/211 |
| 5,764,904 A | * | 6/1998 | Kurashima ................. | 709/208 |
| 5,999,981 A | * | 12/1999 | Willenz et al. ............. | 709/238 |
| 6,041,408 A | * | 3/2000 | Nishioka et al. ........... | 713/171 |
| 6,067,567 A | * | 5/2000 | Bartfai et al. .............. | 709/221 |
| 6,073,235 A | * | 6/2000 | Foladare et al. ........... | 713/163 |
| 6,173,314 B1 | * | 1/2001 | Kurashima et al. ........ | 709/204 |
| 6,185,623 B1 | * | 2/2001 | Bailey et al. ............... | 709/238 |
| 6,243,758 B1 | * | 6/2001 | Okanoue .................... | 709/238 |
| 6,246,696 B1 | * | 6/2001 | Yamaguchi et al. ........ | 370/475 |

FOREIGN PATENT DOCUMENTS

| | | |
|---|---|---|
| EP | 0 776 107 A2 | 5/1997 |

OTHER PUBLICATIONS

Bruce Schneier, Applied Cryptography, 1996, John Wiley and sons inc., second, 59–60.*

"Digital Signatures for Flows and Multicasts," Chung Kei Wong, Proceedings Sixth International Conference on Network Protocols—IEEE Comput. Soc., Oct. 13–16, 1998, pp. 198–209, XP002132749, Los Alamitos, Ca.

* cited by examiner

*Primary Examiner*—Gilberto Barroón
*Assistant Examiner*—Kambiz Zand (57) ABSTRACT

An apparatus and method for limiting unauthorized access to a multicast by one or more members of a subnet reconfigures the multicast if all subnet members participating in the multicast do not reply to a query message. To that end, the apparatus first receives a query message requesting the identity of all subnet members that are participating in the multicast. Upon receipt, the query message is forwarded to each subnet member that is participating in the multicast. Receipt of the message by selected subnet members participating in the multicast causes a reply message to be forwarded. It then is determined if a reply message has been forwarded by all subnet members participating in the multicast.

23 Claims, 6 Drawing Sheets

APPARATUS AND METHOD FOR LIMITING UNAUTHORIZED ACCESS TO A NETWORK MULTICAST

FIELD OF THE INVENTION

The invention generally relates networks and, more particularly, the invention relates to multicast transmissions across a computer network.

BACKGROUND OF THE INVENTION

Multicasting is a well known method of transmitting data messages to selected groups of users across a network, such as the Internet. One simple example of multicasting entails transmitting an E-mail message to a plurality of users that each are on a mailing list. Video conferencing and teleconferencing also use multicasting principles and thus, often are referred to as "multiconferencing." Due to increasing demand, protocols are rapidly being developed and refined to support multicasting over a TCP/IP network (i.e., a Transmission Control Protocol/Internet Protocol network, such as the Internet). Among these protocols is the Internet Group Multicast Protocol ("IGMP"), which allows users to easily create and join multicasting sessions ("multicasts").

(Confidential information commonly is transmitted between multicast users ("members") during a multicast. Accordingly, it often is desirable that such multicasts have an associated list of authorized members that each may participate in the multicast. Any user that is not on the list of authorized members ("unauthorized users") thus is not authorized to participate in the multicast.

There are instances, however, when unauthorized users can silently monitor messages transmitted between authorized members of a multicast. More particularly, a member of a subnet having an authorized member of a multicast often can receive data messages from a subnet network device (e.g., a network server or a router) without being detected by the authorized members of such multicast. Authorized members of the multicast therefore continue to transmit data between themselves without knowing that their messages are being received by the unauthorized user.

The art has responded to this problem by utilizing encryption methods for encrypting data messages transmitted during a multicast. One such encryption method utilizes a symmetrical encryption key to encrypt and decrypt multicast messages. Similar confidentiality problems arise, however, when the encryption key is obtained by an unauthorized user. For example, such encryption key can be illicitly given to the unauthorized user by an authorized member of the multicast. The unauthorized user thus can decrypt each received message with the encrypted key, thereby circumventing the advantages associated with the encryption methods.

SUMMARY OF THE INVENTION

In accordance with one aspect of the invention, an apparatus and method for limiting unauthorized access to a multicast by one or more members of a subnet reconfigures the multicast if all subnet members participating in the multicast do not reply to a query message. To that end, the apparatus first receives a query message requesting the identity of all subnet members that are participating in the multicast. Upon receipt, the query message is forwarded to each subnet member that is participating in the multicast. Receipt of the message by selected subnet members participating in the multicast causes a reply message to be forwarded. It then is determined if a reply message has been forwarded by all subnet members participating in the multicast. As noted above, the multicast is reconfigured if it is determined that a reply message has not been forwarded by all subnet members participating in the multicast.

The selected members participating in the multicast that forward a reply message preferably are authorized members. Moreover, the apparatus preferably is implemented on a subnet network device, such as a router or bridge. As is known by those skilled in the art, routers in a subnet often undesirably provide easy access to a multicast by any of the members of their respective subnets. There are instances, however, when access must be limited to selected users of the subnet. Receipt of a forwarded reply message from an unauthorized subnet member of a multicast thus would immediately alert the authorized multicast members to the existence of such unauthorized subnet member. To guard against those unauthorized subnet members that do not forward a reply message for this reason, each subnet network device automatically causes the multicast to be reconfigured if all participating subnet members (whether authorized or unauthorized) do not respond to the query message with a reply message. Accordingly, an unauthorized user cannot avoid being detected by not responding to the query message.

The multicast may be reconfigured in many ways known in the art. In preferred embodiments, a parameter of the multicast is reconfigured and forwarded to an authorized set of subnet members that are authorized to participate in the multicast (i.e., similar to the above referenced identification data). For example, the parameter may include a data encryption key that is utilized to encrypt and/or decrypt messages transmitted between authorized members. In other embodiments, a given subnet member in the authorized set forwards a reply message with identification data confirming that the given subnet member is an authorized member of the multicast. The identification data may include, for example, a digital signature of the given subnet member, or a random number associated with the data encryption key for the multicast.

In alternative embodiments, each reply message includes membership data indicating whether or not the forwarding member is an authorized member of the multicast. In such case, the membership data first is located in each reply message to determine if the replying member is an authorized member. The multicast is reconfigured if the membership data in any one of the reply messages indicates that one of the participating members is not an authorized member. The membership data may include a random number that is associated with the data encryption key.

In accordance with another aspect of the invention, an apparatus and method for limiting unauthorized access to a multicast by one or more members of a subnet first forwards a query message to all subnet members participating in the multicast. The query message includes, among other things, a request for the identity of all such subnet members. In response to receipt of the query message, selected subnet members forward a reply message. A given reply message that is forwarded by a given member includes identification data identifying the given member.

After the reply message is forwarded, the identification data in the given reply message is located. The multicast is reconfigured if the given member is not an authorized member of the multicast.

In preferred embodiments, the multicast is reconfigured by reconfiguring a parameter of the multicast, and then forwarding the reconfigured parameter to an authorized set of subnet members that are authorized to participate in the multicast. The identification data identifying the given member may include a digital signature of the given member, or a data encryption key that is utilized to encrypt and/or decrypt messages transmitted between authorized members of the multicast.

In alternative embodiments, it is determined if a reply message has been forwarded by all subnet members participating in the multicast. The multicast is reconfigured if it is determined that a reply message has not been forwarded by all subnet members participating in the multicast. In other embodiments, the query message is forwarded by a forwarding member of the multicast that is not a member of the subnet. The subnet may include a local network of computers that is coupled to a larger computer network (e.g., the Internet). The local network may be a local area network.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

In accordance with preferred embodiments of the invention, members of a multicast can both confirm the membership of their multicast, and remove network users that are not authorized to participate in the multicast. A network user is considered to be an unauthorized member of a multicast (a/k/a "unauthorized user") when such user is not one of a plurality of network users that are authorized to participate in such multicast.

Figure 1:
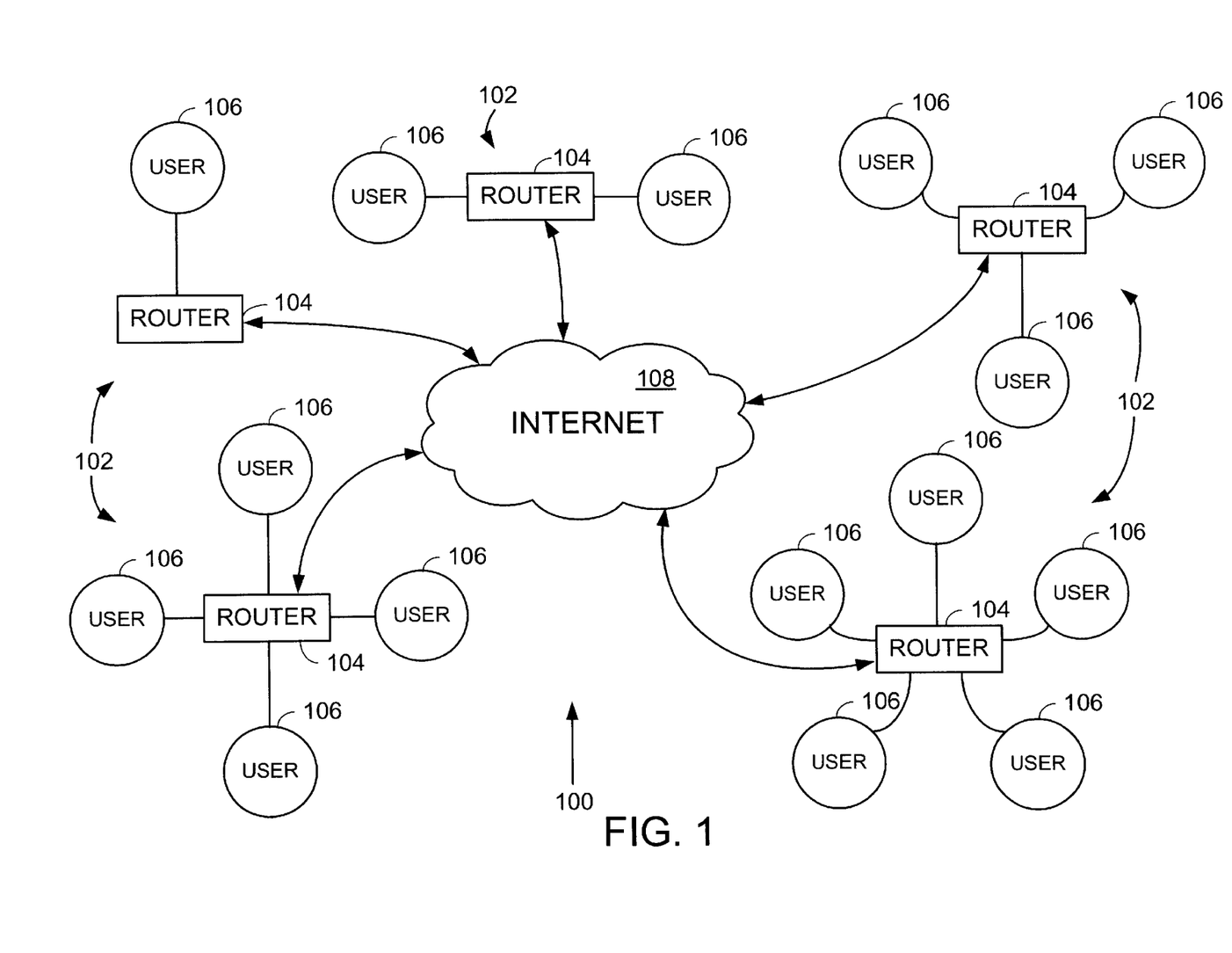
FIG. 1 schematically shows an exemplary network arrangement in which preferred embodiments of the invention may be implemented.

FIG. 1 schematically shows an exemplary network 100 in which preferred embodiments of the invention may be implemented. The network 100 includes five independent subnets 102 that each include a network device 104, and one or more users ("subnet members 106" or "users 106"). Each network device 104, which can be a router, server, or other known network device, preferably is coupled to a larger network 108 (e.g., the Internet). The routers can be any router known in the art, such as a BAYSTACK™ router, available from Bay Networks Inc. of Santa Clara, Calif. Each router preferably is specially configured, as described in detail below, to limit access to a multicast by unauthorized users.

The subnet members of each subnet 102 may include a computer system (e.g., an IBM THINKPAD 701® computer, distributed by International Business Machines of Armonk, N.Y.), a computer terminal, or other similar device that provides access to the Internet via the central network device 104. As known by those skilled in the art, a multicast session ("multicast") may be initiated and conducted between various combinations of the network users 106. For example, one or more members from each subnet 102 may participate in a single multicast. The multicast may be any type of multicast, such as a video conference or a teleconference. All references below to items 102, 104, 106 and 108 are references to FIG. 1 and are shown therein.

Figure 2:
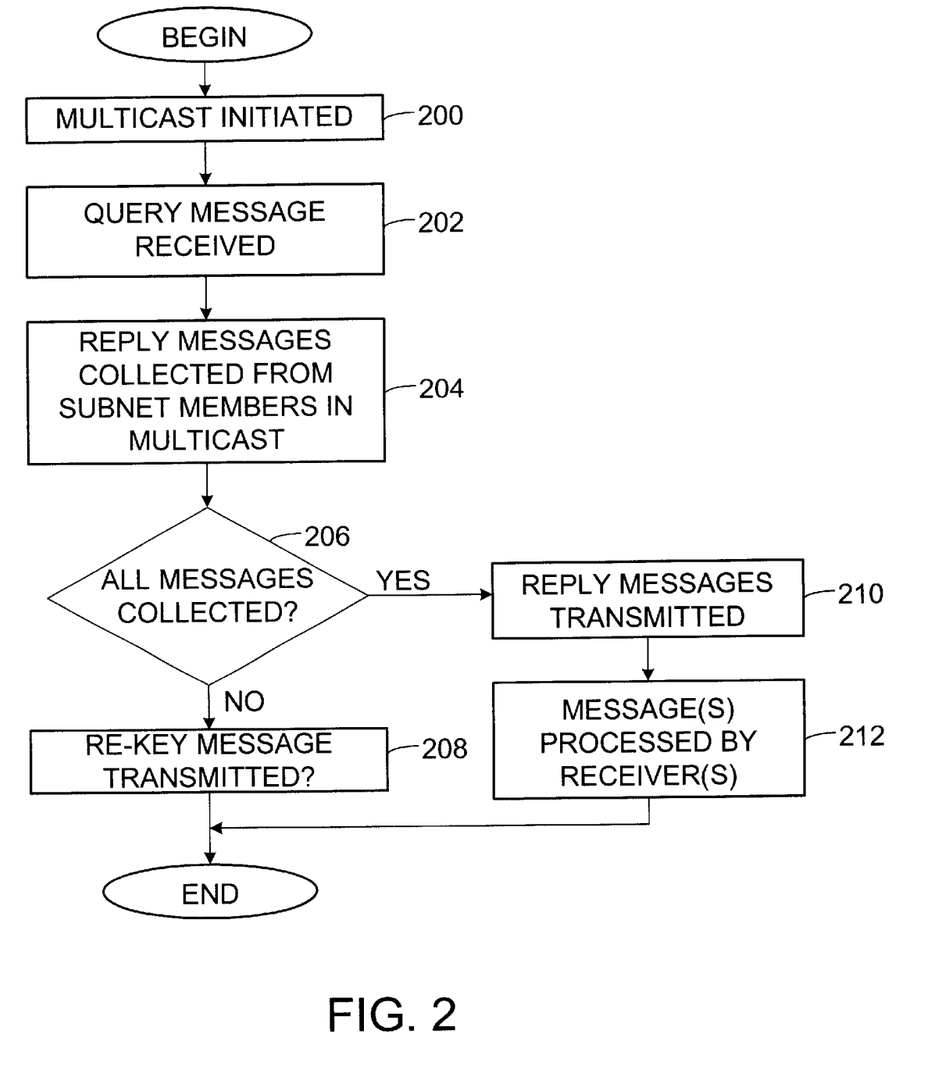
FIG. 2 generally shows a preferred process for limiting access to a multicast by an unauthorized user.

FIG. 2 generally shows a preferred process for limiting access to a multicast by an unauthorized user. Additional details of various steps in this process are discussed in succeeding FIGS. 3 to 6. The process begins at step 200 in which a multicast is initiated by a network user 106 (the "initiator"). The initiator, which may be a member of any subnet 102 in the network, generates various parameters to initially configure the multicast. In preferred embodiments, one of those parameters is a symmetrical encryption key that is utilized by each authorized member of the multicast to encrypt multicast data traffic, thus preventing unauthorized network users from monitoring and/or participating in the multicast. The symmetrical encryption key may be selected that comply with any well known data encryption method, such as the Rivest, Shamir, and Adleman cryptography method. Of course, the symmetrical key effectively limits a unauthorized users from interpreting monitored messages from a multicast as long as unauthorized users do not obtain the key.

Authorized members of the multicast may be selected, and their identities' stored in a data structure, by the initiator. In preferred embodiments, the Internet Protocol address of the each authorized member is stored in a member list on the network device 104 of each subnet 102, and/or on the computer systems utilized by the various authorized members. This member list is updated when a new user is added to the multicast, and when an existing user logs off of the multicast. Additional details of step 200 are described below with reference to FIG. 3.

Figure 3:
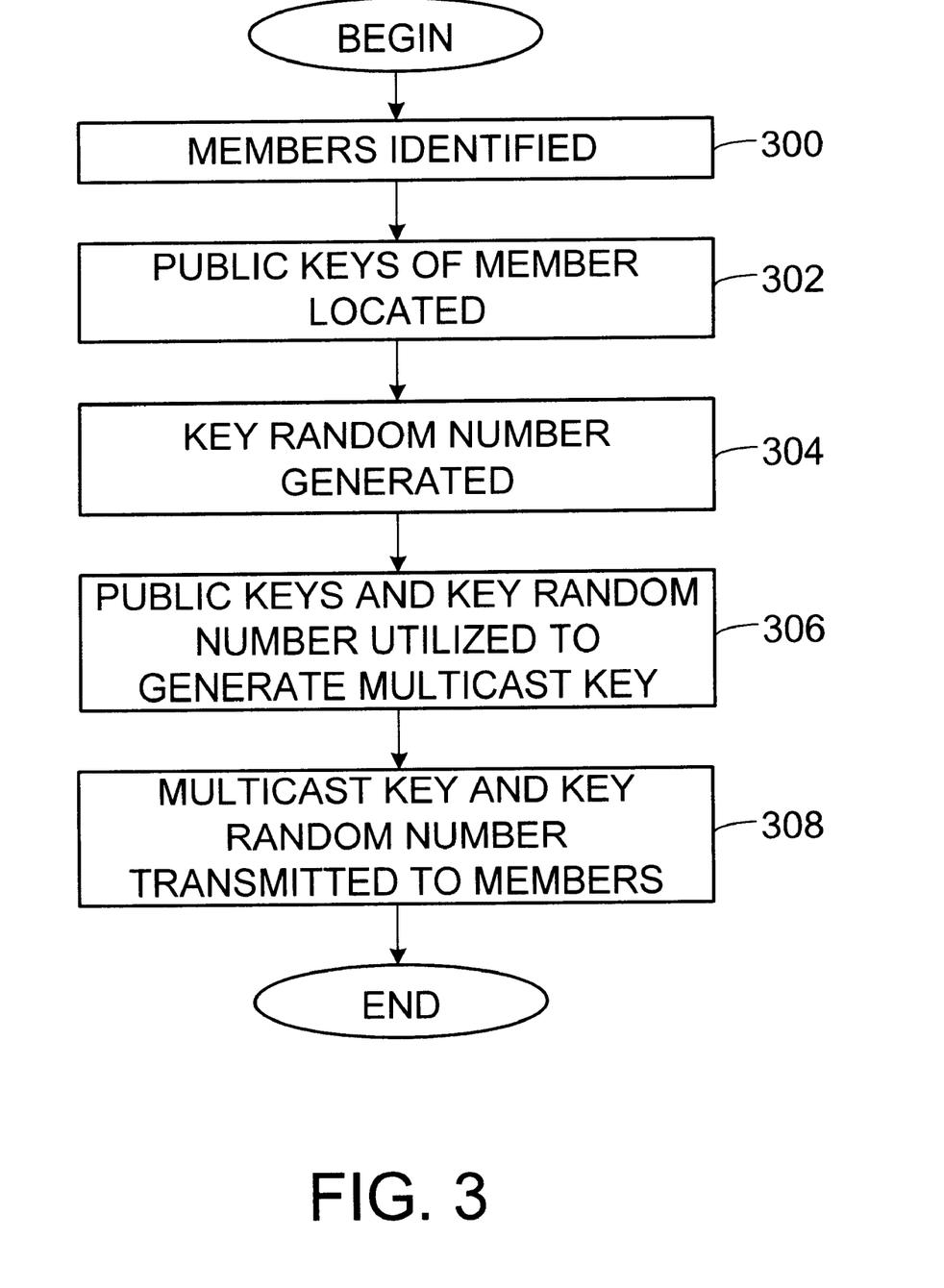
FIG. 3 shows a preferred process of initiating a multicast.

Once the multicast is initiated, the process continues to step 202 in which a query message requesting the identity of all authorized members is received by a receiving subnet 102. The query message may be generated and transmitted across the Internet 108 to all subnets 102 having an authorized member listed in the member list. Accordingly, the receiving subnet 102 may be any subnet 102 having an authorized member of the multicast. In preferred embodiments, the query message is received by the network device 104 of the receiving subnet 102, and then broadcasted to all nodes of the subnet 102. In alternative embodiments, the network device 104 accesses a stored multicast table listing each subnet member participating in the multicast. Such subnet members, however, may not be authorized members. After accessing the multicast table, the network device 104 forwards the query message to all subnet members participating in the multicast.

In some embodiments, the network device 104 also forwards the query message to other network devices 104 (on other subnets 102) having members of the multicast. To that end, the network device 104 may consult a multicast network device table (e.g., a router table) for the multicast, and forward the query message from the network device 104 toward the other network devices 104. Accordingly, the query message may be forwarded by any useful transport method, such as a multicast distribution tree method. One such method is known in the art as a Distance Vector Multicast Routing Protocol standard ("DVMRP"), defined by the Internet Engineering Task Force ("IETF") and an example of a "Source Based Distribution Tree." Another such method is known in the art as a Core Based Tree standard ("CBT"), also defined by the IETF and an example of a "Shared Tree Distribution Tree."

In a similar manner to those described above, the query message may be transported to other subnets 102 by transmitting the query message directly to all network devices 104 that have an authorized member. All such subnet network devices 104 may be members of a set of network devices 104 that participate in the multicast and transmit data messages directly to each other. Upon receipt, each receiving network device 104 may forward the query message to all authorized and/or participating members of the multicast.

Receipt of the query message by a participating member causes such member to generate a reply message. Accordingly, after the query message is received by a subnet network device 104 and forwarded to the participating members, such network device 104 collects each reply message that is generated by the participating members in the subnet 102 (step 204). As discussed in greater detail in FIG. 5 below, each reply message preferably includes data identifying the subnet member generating the respective reply message. For example, a given participating member may include its digital signature in the reply message.

After a specified condition is met, it then is determined at step 206 if all reply messages have been collected from all participating subnet members in the multicast. The specified condition may be a preset amount of time that the network device 104 is to wait for the reply messages. If it is determined that all messages were not collected by the subnet network device 104 (i.e., one or more of the participating members did not forward a reply message to the network device 104), then the process continues to step 208 in which the multicast is reconfigured by generating a new multicast parameter (e.g., a new encryption key). To that end, a re-key message preferably is transmitted to the initiator indicating that the encryption key must be changed. The initiator responsively produces a new encryption key and transmits such key to all authorized members via a secure channel. Use of the new encryption key effectively prevents the subnet member(s) that did not respond to the query message from participating in the multicast since such subnet member cannot decrypt multicast data traffic without the new key. It should be noted that although the encryption key was changed in this example, any other multicast parameter may be changed without departing from the spirit of preferred embodiments of the invention.

Conversely, if all of the messages were determined to be collected at step 206 (i.e., all participating members forwarded a reply message to the network device 104), then the process continues to step 210 in which the reply messages are transmitted to the member that generated the query message. In alternative embodiments, the reply messages are transmitted to all authorized members in the multicast (i.e., all members listed in the member list of the subnet network device 104). The process then continues to step 212 in which the reply messages are processed by the receiving authorized member(s) to determine if the network users that generated the respective reply messages are authorized members of the multicast. If any one of the network users is determined not to be a member of the multicast, then the multicast is reconfigured in a manner similar to that described above. In a manner similar to the process in step 208, details of this process of reconfiguring the multicast are discussed in greater detail below with reference to FIG. 6.

Execution of the process in FIG. 2 therefore prevents unauthorized multicast access by requiring that all participating members identify themselves, or be unilaterally removed from the multicast. The multicast may be any type known in the art, such as a one-to-many multicast (e.g., a pay-per-view transmission), or a many-to-many multicast (e.g., a video conference). As noted above, details of various steps of the process are discussed below with reference to FIGS. 3 to 6.

FIG. 3 shows a preferred process of initiating a multicast as executed in step 200 of FIG. 2. This process preferably is executed each time a multicast is either initiated, or the parameters of a multicast are to be changed. For example, in preferred embodiments of the invention, this process is executed each time a new authorized member is added to a multicast, and each time an existing member of a multicast logs off from an existing multicast.

The process begins at step 300 in which authorized members of the multicast are identified by the initiator. For example, each authorized member may have previously notified the initiator that they are to participate in the multicast at a specified time. The identity of each authorized member then is stored in the prior noted member list. The process then continues to step 302 in which the public keys of all authorized members are obtained by the initiator. As known in the art, the public keys may be ascertained by accessing a key certification authority that maintains the public keys for network users. After the public keys are obtained, then a key random number is generated at step 304. The initiator then utilizes both the public key of each authorized member and the key random number as input to a key generation function that generates the encryption key (step 306). The function key may be any function in the art that can generate the encryption key, such as a hashing function.

The process then continues to step 308, in which the initiator transmits both the encryption key and the key random number to each network user 106 in the member list (i.e., the authorized members of the multicast) via secure channels. The initiator also may transmit additional data to the authorized members, such as the identity of the members in the member list.

Figure 4:
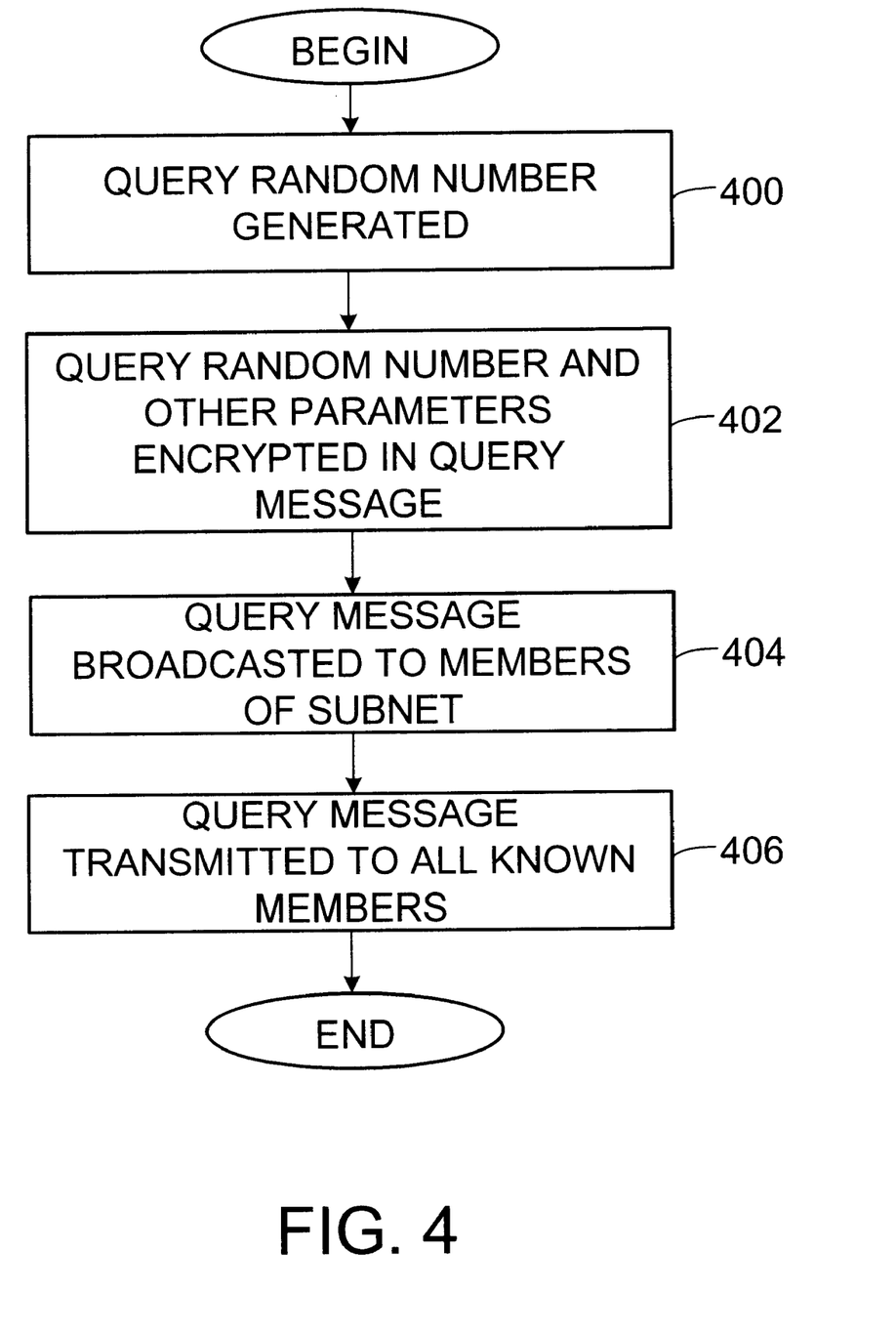
FIG. 4 shows a preferred process utilized by the any authorized member of a multicast to generate a query message.

FIG. 4 shows a preferred process utilized by any authorized member of the multicast ("querying member") to generate a query message. The process begins at step 400 in which the querying member generates a query random number. Similar to the key random number, the query random number may be any random number. The process then continues to step 402 in which the query random number and other parameters are encrypted to form an encrypted payload. Among other things, the other parameters may include a date stamp, or the IP address and public key of the querying member. The encrypted payload then is added to the data portion of the query message, which also includes a header having data indicating that such message is a query message.

The query message then is broadcasted to all members of the subnet 102 to which the querying member belongs (step 404). The process then continues to step 406, in which the query message is transmitted to all known members of the multicast (i.e., those network users 106 identified in the member list). As noted above, the query message may include control data requiring the reply messages to be transmitted either to the querying member only, or to all members of the multicast.

Figure 5:
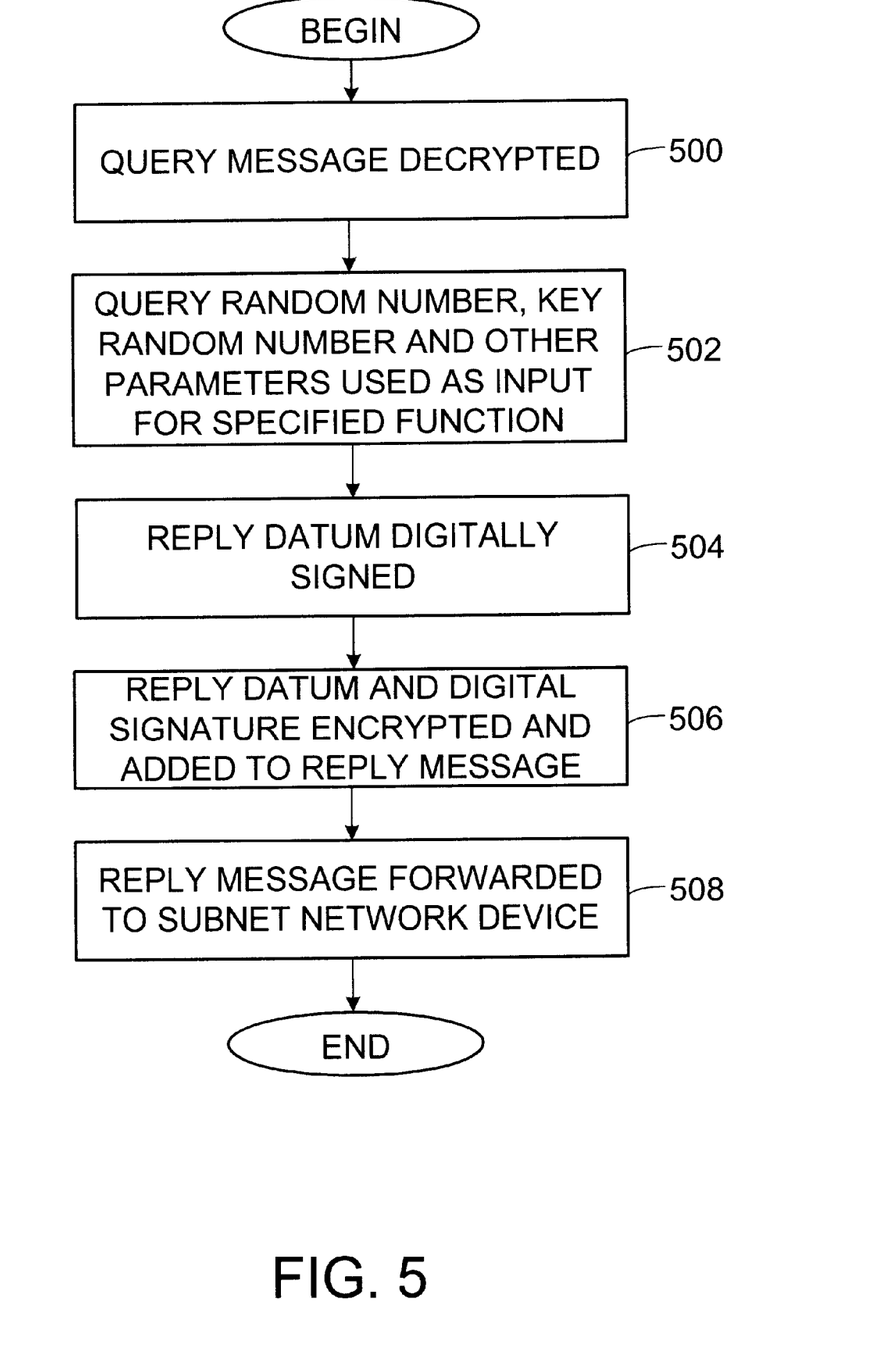
FIG. 5 shows a preferred process utilized by a network user to generate a reply message in response to a query message.

FIG. 5 shows a preferred process utilized by a network user 106 to generate a reply message ("replying user") in response to a query message. The process begins at step 500 in which the replying user extracts and subsequently decrypts the encrypted payload (from the query message) to obtain the query random number and other parameters. The process then continues to step 502 in which various data values are utilized as input to a specified function to generate a reply datum. The data values may include, for example, the query random number, the IP address of the replying user, and the key random number. The specified function that generates the reply datum may be any function that provides the desired output, such as a logical XOR operation. Accordingly, the prior noted exemplary data values may be XORed together to produce the reply datum.

The process then continues to step 504, in which the replying user digitally signs the reply datum in accord with conventional processes. Other known methods of providing identification data may be utilized. The reply datum and accompanying digital signature then are encrypted and added to the data portion of the reply message (step 506). When the reply message is to be transmitted to all authorized members, the encryption key of the multicast may be utilized to encrypt the reply message. Conversely, when the reply message is to be transmitted to a querying user only, then such user's public key may be utilized to encrypt the reply message. In some embodiments, the encryption key of the multicast is utilized to encrypt the reply message even if the reply message is to be transiMitted to the querying user only. The reply message then is forwarded to the replying user's subnet network device 104, which responsively transmits the reply message as noted above (step 508).

Figure 6:
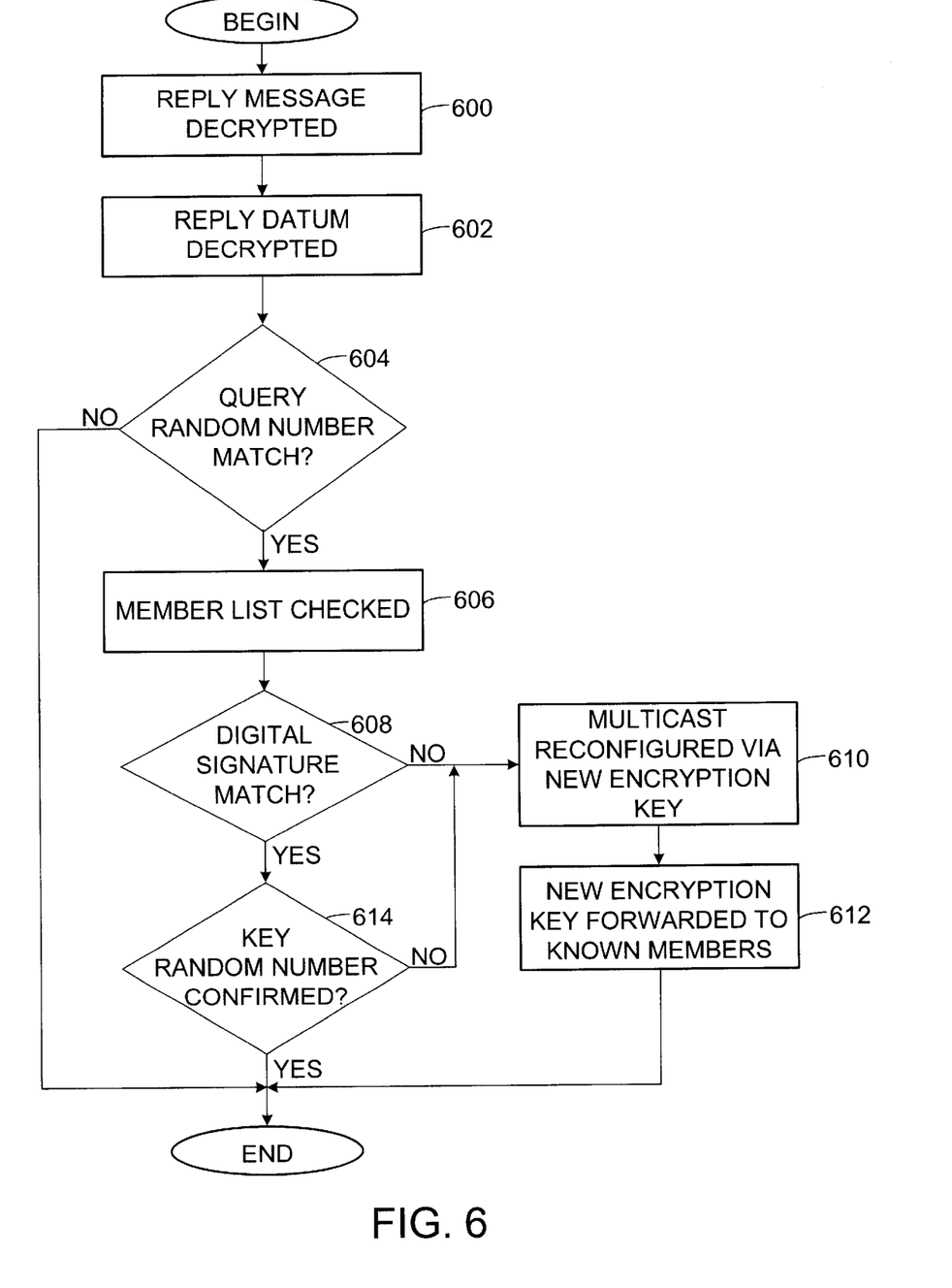
FIG. 6 shows a preferred process utilized by a querying multicast user for processing a reply message.

FIG. 6 shows a preferred process of processing a reply message as required by step 212 of FIG. 2. The process begins at step 600, in which the reply message is received by a receiving member. The receiving member then decrypts the reply datum portion of the reply message to obtain the query random number, other included data, and the digital signature (step 602). It then is determined at step 604 if the query random number is identical to that in the query message. If not identical, then the process ends. If identical, then the process continues to step 606 in which the digital signature and/or the IP address (the "identifying data") in the reply datum then are compared to the member list in the confirm that the replying user is an authorized member of the multicast.

It then is determined at step 608 if the identifying data matches a member identity in the member list. If no match is found, then the replying user is not an authorized member of the multicast. Accordingly, the process then continues to step 610 in which the multicast is reconfigured by generating a new encryption key (see, for example, FIG. 3). The new encryption key then is forwarded to known members via a secure channel (step 612), thus completing the process.

Returning to step 608, if it is determined that the identifying data does not match a member identity in the member list, then it is determined if the key random number is identical to that utilized to generate the encryption key (step 614). If not identical, then the process loops to step 610, in which the multicast is reconfigured. If identical, then the process ends, thus confirming the identity of the replying user.

In addition to confirming that a replying user is an authorized member, the query random number may be utilized to differentiate between different query messages. For example, a querying member may transmit a first message at a first time, and a second query message at a second time that is later than the first time. The reply message(s) from the second query message, however, may be received prior to the reply message(s) from the first query message. Accordingly, the query random number may utilized by the querying member to check a specified member list, for example, that corresponds with a specified multicast, or a specified time frame.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements, or other related components.

Alternative embodiments of the invention may be implemented as a computer program product for use with a computer system. Such computer system may include either or both of the network device 104 for all subnets 102 in a multicast, and the network user computer systems on each such subnet 102. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory. device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet 108 or World Wide Web).

Although various exemplary embodiments of the invention have been disclosed, it should be apparent to those skilled in the art that:various changes and modifications can be made which will achieve some of the advantages of the invention without departing from the true scope of the invention. These and other obvious modifications are intended to be covered by the appended claims.

I claim:

1. A method of limiting unauthorized access by one or more members of a subnet to a multicast transmitted across a network, the subnet having one or more subnet members participating in the multicast, the method comprising:

receiving a query message requesting the identity of all subnet members that are participating in the multicast;

forwarding the query message to each electrically present subnet member that is participating in the multicast, receipt of the query message causing a reply message to be forwarded by selected subnet members participating in the multicast;

determining if a reply message has been forwarded by all subnet members participating in the multicast; and reconfiguring the multicast if it is determined that a reply message has not been forwarded by at least one unauthorized but valid subnet member participating in the multicast.

2. The method as defined by claim 1 wherein the step of reconfiguring includes reconfiguring a parameter of the multicast, the method further comprising:

forwarding the reconfigured parameter to an authorized set of subnet members that are authorized to participate in the multicast.

3. The method as defined by claim 2 further comprising:

controlling a given subnet member in the authorized set to forward a reply message with identification data, the identification data confirming that the given subnet member is an authorized member of the multicast.

4. The method as defined by claim 3 wherein the identification data includes a digital signature of the given subnet member.

5. The method as defined by claim 2 wherein the parameter includes a data encryption key that is utilized to encrypt and/or decrypt messages transmitted between authorized members of the multicast.

6. The method as defined by claim 1 wherein the selected members participating in the multicast are authorized to participate in the multicast.

7. The method as defined by claim 1 wherein each reply message includes membership data indicting whether or not the forwarding member is an authorized member of the multicast, the method further comprising:

locating the membership data in each reply message; and reconfiguring the multicast if the membership data in one of the reply messages indicates that one of the participating members is not an authorized member.

8. The method as defined by claim 7 wherein the membership data includes a random number that is associated with an encryption key for the multicast.

9. An apparatus for limiting unauthorized access by one or more members of a subnet to a multicast transmitted across a network, the subnet having one or more subnet members participating in the multicast, the apparatus comprising:

an input for receiving a query message requesting the identity of all valid subnet members that are participating in the multicast;

a message forwarder that forwards the query message to each authorized and unauthorized subnet member that is valid and is participating in the multicast, receipt of the query message causing a reply message to be forwarded by selected subnet members participating in the multicast;

a reply message collector that determines if a reply message has been forwarded by all valid subnet members participating in the multicast; and a reconfiguration module that reconfigures the multicast if it is determined that a reply message has not been forwarded by all subnet members participating in the multicast.

10. The apparatus as defined by claim 9 wherein the reconfiguration module includes means for reconfiguring a parameter of the multicast, the apparatus further comprising:

an output for forwarding the reconfigured parameter to an authorized set of subnet members that are authorized to participate in the multicast.

11. The apparatus as defined by claim 10 further comprising:

a controller that controls a given subnet member in the authorized set to forward a reply message with identification data, the identification data confirming that the given subnet member is an authorized member of the multicast.

12. The apparatus as defined by claim 11 wherein the identification data includes a digital signature of the given subnet member.

13. The apparatus as defined by claim 10 wherein the parameter includes a data encryption key that is utilized to encrypt and/or decrypt messages transmitted between authorized members of the multicast.

14. The apparatus as defined by claim 9 wherein the selected members participating in the multicast are authorized to participate in the multicast.

15. The apparatus as defined by claim 9 wherein each reply message includes membership data indicting whether or not the forwarding member is an authorized member of the multicast, the reconfiguration module being a first reconfiguration module, the apparatus further comprising:

a locator that locates the membership data in each reply message; and a second reconfiguration module that reconfigures the multicast if the membership data in one of the reply messages indicates that one of the participating members is not an authorized member.

16. The apparatus as defined by claim 15 wherein the membership data includes a random number that is associated with an encryption key for the multicast.

17. A method of limiting unauthorized access by one or more members of a subnet to a multicast transmitted across a network, the subnet having one or more valid and authorized subnet members participating in the multicast, the method comprising:

forwarding a query message requesting the identity of all valid authorized and unauthorized subnet members that are participating in the multicast, receipt of the query message causing a reply message to be forwarded by selected subnet members participating in the multicast, a given reply message being forwarded by a given member, the given reply message having identification data identifying the given member;

locating the identification data in the given reply message; and reconfiguring the multicast if the given valid member is not an authorized member of the multicast.

18. The method as defined by claim 17 wherein the step of reconfiguring includes reconfiguring a parameter of the multicast, the method further comprising:

forwarding the reconfigured parameter to an authorized set of subnet members that are authorized to participate in the multicast.

19. The method as defined by claim 17 wherein the identification data identifying the given member includes a digital signature of the given member.

20. The method as defined by claim 17 wherein the identification data identifying the given member includes a data encryption key that is utilized to encrypt and/or decrypt messages transmitted between authorized members of the multicast.

21. The method as defined by claim 17 further comprising:

determining if a reply message has been forwarded by all subnet members participating in the multicast; and reconfiguring the multicast if it is determined that a reply message has not been forwarded by all subnet members participating in the multicast.

22. The method as defined by claim 17 wherein the query message is forwarded by a forwarding member of the multicast, the forwarding member not being a member of the subnet.

23. The method as defined by claim 17 wherein the subnet includes a network of computer devices that is coupled to the Internet.

* * * * *